United States Patent Office 3,193,999
Patented July 13, 1965

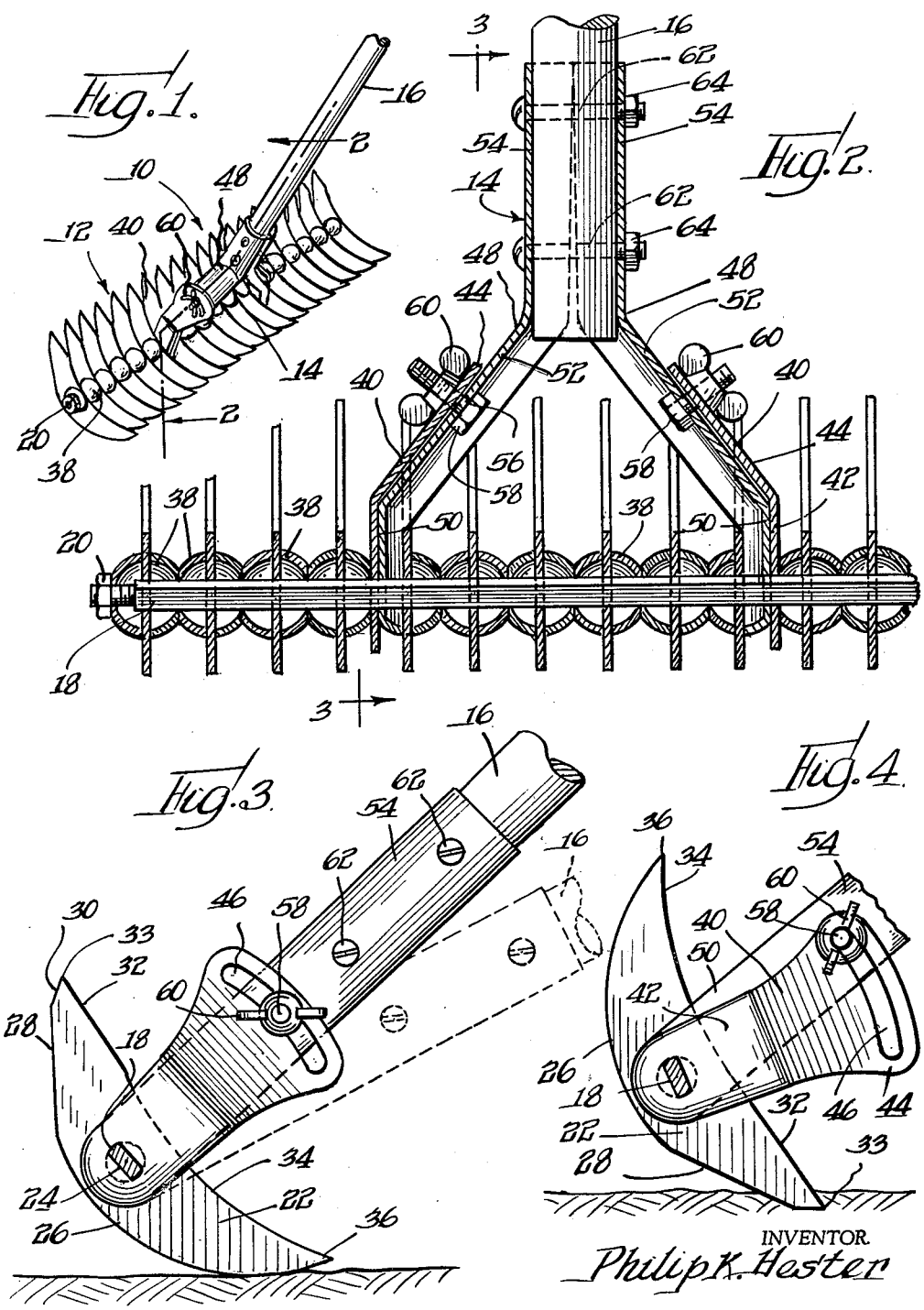

3,193,999
HAND RAKE
Philip K. Hester, 700 Seahorn St., Gurdon, Ark.
Filed July 16, 1963, Ser. No. 295,378
4 Claims. (Cl. 56—400.16)

This invention relates to an improved construction for a rake, and more particularly, for an improved construction whereby a rake handle may be selectively adjusted relative to its rake head to accommodate operators of varying heights.

In the operation of a self-cleaning rake which has tines having a curved outer periphery, it is desirable to move the rake along the ground without lifting the rake. In the operation of such a rake, the rake head rides on the curved portion of the tines and the inside portion of the head collects matter to be raked. Inasmuch as the rake continually rests on the ground, it is apparent that a person operating the rake moves the rake back and forth by swinging the arm. This means that the head of the rake periodically tilts with each movement of the arm. The tines have points on one end in order to separate grass or other material and collect material on the inside of the rake. It is readily apparent that if the points of the tines are too low, the rake head will be tilted downward so that the points of the tines become imbedded in the ground, thus tearing up the ground and doing an inefficient job of collecting material. On the other hand, if the points are too high, the tines will not collect material, but rather the rake will ride over the material to be raked. It is, therefore, important to keep the points of the tines at a proper attitude relative to the ground.

Ordinarily, a self-cleaning rake is used by people of varying heights. Normally, people hold the rake near the end of the handle so that the angle of the handle and, thus, the position of the points of the tines relative to the ground is determined by the height of the person using the rake. It is, therefore, apparent that if the handle is fixed relative to the tines, when a tall person operates the rake, the points of the tines are too high off of the ground, thereby allowing the rake to ride over materials to be collected. On the other hand, if a short person uses the fixed rake, the tines are too close to the ground and may become imbedded in the ground during a portion of the raking operation. It is, therefore, readily apparent that it is desirable to provide a self-cleeaning rake which has a handle which may have its angle relative to the rake head adjusted so that irrespective of whether a tall person or a short person uses the rake the head of the rake may be properly adjusted relative to the handle to position the points of the tines at a proper height relative to the ground.

It is another object of the present invention to provide a rake construction in which the handle of the rake may be adjusted relative to a self-cleaning rake head in order to position the handle in a proper attitude relative to the tines of the rake so that the rake may be used as a conventional rake.

It is a further object of the instant invention to provide a rake construction which has an adjustable rake handle relative to the rake head and which adjustment may be simply and effectively made.

It is a still further object of the herein disclosed invention to provide a rake construction in which the handle is adjustable relative to the rake head and the rake is economical to manufacture.

Other objects and uses of this invention will become readily apparent to those skilled in the art upon a perusal of the following specification in light of the accompanying drawing in which:

FIGURE 1 is a perspective view of a portion of a self-cleaning rake embodying the herein disclosed invention;

FIGURE 2 is a cross-sectional view taken on line 2—2 of FIGURE 1;

FIGURE 3 is a partial cross-sectional view taken on line 3—3 of FIGURE 2 and showing a second position of the rake handle in dotted form; and FIGURE 4 is a side elevation of a portion of the rake shown in FIGURE 1 shown in an attitude wherein the rake is used as a conventional rake.

Referring now to the drawing, especially to FIGURE 1, it may be seen that a rake embodying the herein disclosed invention and indicated by numeral 10, generally consists of a rake head 12, a connecting assembly 14 attached to the rake head, and a handle 16 fixed to the connecting assembly.

The rake head 12 includes a shaft 18 which, in this instance, has a rectangular cross-section. The ends of the shaft are threaded to receive a nut 20 on each end of the shaft. A plurality of tines 22 are non-rotatably mounted on the shaft and held therein by the nuts 20. Each of the tines is identical in construction to each of the other tines.

Each tine 22 has a rectangular aperture 24 in its body portion which aperture matably receives the shaft so that the shaft connects the tines. A portion of the outer periphery of each of the tines is a curved outer edge 26 which is a portion of a circle. The outer edge or lower edge of the tine is completed by a straight edge 28 and a second straight edge 30. The inner edge or upper edge of each of the tines includes an inner straight edge 32 which intersects the second straight edge 30 to form a point 33. The remainder of the inner portion of each of the tines is formed as a portion of an arc 34 which intersects the curved outer portion 26 to form a point 36.

Positioned between the adjacent tines is a pair of spacers 38 in order to keep the tines an appropriate distance apart since the tines are slideable on the shaft. The tines and spacers are all slideably mounted on the shaft 18 and are held in position by the nuts 20.

The connecting assembly 14 is attached to the shaft 18. The connecting assembly includes a pair of identical adjustment plates 40. Each of the adjustment plates 40 has an up-standing portion 42 with a rectangular hole contained therein and matably receives the shaft 18. Formed integral with the up-standing portion 42 is a quadrant section 44. The quadrant section includes a curved slot 46 which is a portion of a circle which has its center at the center of the rectangular hole.

A connecting bracket or brace 48 is positioned adjacent to each of the adjustment plates. Each brace 48 has a spacer portion 50 which contains a circular hole therein for rotatably receiving the shaft 18. Formed integral with the spacer portion 50 is a bolt mounting section 52 which is substantially parallel to the quadrant section 44 of the adjustment plate 42. Formed integral with the bolt mounting section is a curved handle gripping portion 54 for receiving the handle 16 between the handle gripping portions. Each of the bolt mounting sections 52 contains a hole 56 therein and a bolt 58 is positioned in the hole 56 and extends through the slot 46. A wing nut 60 is threadedly mounted on the bolt 58 to hold the adjustment section 40 in frictional engagement with the bolt section 52 and thereby provide a means for securing the brace to its respective adjustment plate.

The handle 16 is attached to the connecting bracket 14 by a pair of bolts 62 which extend through holes in the gripper portions and through holes in the handle 16. The bolts 62 are held in place by nuts 64 to securely fix the handle between the gripper portions 54.

In the operation of the self-cleaning rake, it is desirable for the curved outer edge 26 of the tines to rest on the surface to be raked in an attitude substantially as shown in FIGURE 3. The rake is used by sliding the rake forward so that the curved tines ride over any material to be raked. The rake is then pulled back, and the points 36 of the tines move between the surface of the ground and any material that is to be raked. The material which is collected on the rake reposes on the curved inner surface 34 of the tines. When the rake is brought to the end of its stroke and is moved forward again, the material on the curved upper surface falls off and is deposited in a rearward location. It may be readily appreciated that the rake is never lifted off the ground during its normal operation. Thus, the rake is easier to use since it is a simple gliding action that occurs rather than a periodic lifting and pulling. Furthermore, the rake does not dig into the ground which is not desirable in many instances.

From the foregoing description of the operation of the rake, it may be appreciated that it is desirable to maintain the head of the rake at a prescribed attitude relative to the ground. Unfortunately, people who operate the rake are of varying heights. Thus, a very tall man would hold the points 36 too high so that many materials would be missed whereas a short man would have a tendency to tilt the head too much so that the points 36 would dig into the ground, and thus the effectiveness of the rake is destroyed. The handle of the instant rake may be adjusted relative to the rake head so that the rake may be readily adapted for persons of varying heights. As may be seen in FIGURE 3, with the rake handle positioned so that the bolts 58 are about in the middle of the slot 46, the handle extends substantially upward so that a tall person holding the rake holds the points 36 above the ground. On the other hand, should a short person hold the handle, the handle may be tilted downward so that the bolts are at the end of the slot 46 in the attitude shown in phantom view in FIGURE 3, thus, a short person may handle the rake and still keep the points 36 at the same relative distance from the ground.

It may be appreciated that in order to tilt the rake handle relative to the rake head, the wing nuts 60 are loosened so that the brackets 48 may slide relative to the adjustment plate 40 to assume the proper angle of the handle relative to the rake head. Once the proper disposition of the handle relative to the rake head is achieved, the wing nuts are tied to secure the handle in position.

It may be appreciated that the instant rake may be used as a conventional rake by using the opposite ends of the tines, that is, points 33. The handle may be adjusted relative to the rake head for this use, also, as shown in FIGURE 4.

Although a specific embodiment of the herein disclosed invention has been shown in the accompanying drawing and described in detail above, it may be readily appreciated that those skilled in the art may make various modifications and changes in a self-cleaning rake without departing from the spirit and scope of the present invention. It is to be expressly understood that the instant invention is limited only by the appended claims.

What is claimed is:

1. A self-cleaning rake comprising, in combination, an elongated shaft of non-circular cross-section; a plurality of tines each having a curved outer edge and a non-circular aperture whose configuration and dimensions closely approximate said cross-section of said shaft, said shaft passing through each of said apertures in said tines to non-rotatably mount said tines on said shaft; at least one adjustment plate having a non-circular aperture whose configuration and dimensions closely approximate said cross-section of said shaft, said shaft passing through said non-circular aperture in said adjustment plate to non-rotatably mount it on said shaft between a pair of said tines; at least one connecting bracket having a circular aperture, the diameter of which closely approximates the largest dimension of said shaft, said shaft passing through said aperture of said connecting bracket to rotatably mount it on said shaft closely adjacent said adjustment plate; means for releasably securing said connecting bracket to said adjustment plate in a plurality of selected positions; and a handle having one end fixed to said connecting bracket.

2. A self-cleaning rake as claimed in claim 1 in which there is a pair of adjustment plates and a pair of connecting brackets, adjacent adjustment plates and connecting brackets being spaced along said shaft.

3. A self-cleaning rake as claimed in claim 2 in which there are a plurality of spacers mounted on said shaft to evenly space adjacent tines from each other.

4. A self-cleaning rake as claimed in claim 3 in which each of said adjustment plates has an elongated arcuate slot which is part of a circle having the axis of said shaft as its center and each of said connecting brackets is provided with a threaded member passing through said slot whereby said connecting brackets may be secured to said adjustment plates in a plurality of selected positions by screwing home a nut member on said threaded member.

References Cited by the Examiner

UNITED STATES PATENTS

| 334,444 | 1/86 | Lander | 306—15 |
| 719,723 | 2/03 | Beebe | 306—10 X |
| 1,452,984 | 4/23 | Richards | 306—11 |
| 1,894,306 | 1/33 | Eifert | 56—400.16 |

FOREIGN PATENTS 26,562   1/05   Great Britain.

ABRAHAM G. STONE, *Primary Examiner.*

RUSSELL R. KINSEY, T. GRAHAM CRAVER,
*Examiners.*